United States Patent [19]

Vinton et al.

[11] Patent Number: 4,803,868
[45] Date of Patent: Feb. 14, 1989

[54] HERMETICALLY SEALED PACKAGE TESTER

[75] Inventors: Melvin Vinton; Anthony D. McI. Hawes, both of Cambridge, England

[73] Assignee: Analytical Instruments Limited, Pampisford, England

[21] Appl. No.: 90,905

[22] Filed: Aug. 31, 1987

[30] Foreign Application Priority Data

Aug. 29, 1986 [GB] United Kingdom ............... 8620966

[51] Int. Cl.⁴ .......................................... G01M 3/36
[52] U.S. Cl. ........................................ 73/49.3; 73/52
[58] Field of Search .................. 73/40, 49.3, 52, 49.2

[56] References Cited

U.S. PATENT DOCUMENTS

| | | | |
|---|---|---|---|
| 3,771,351 | 11/1973 | Sacks et al. | 73/52 |
| 3,802,251 | 4/1974 | Durr | 73/49.3 |
| 3,837,215 | 9/1974 | Massage | 73/49.3 |
| 3,859,844 | 1/1975 | Hruby | 73/49.3 |
| 3,959,723 | 5/1976 | Wagner | 324/61 P |
| 3,991,622 | 11/1976 | Oowada | 73/52 |
| 4,326,408 | 4/1982 | Kanoh | 73/49.3 |
| 4,656,866 | 4/1987 | Aarts | 73/49.3 |

FOREIGN PATENT DOCUMENTS

| | | | |
|---|---|---|---|
| 125090 | 11/1978 | Japan | 73/52 |
| 127438 | 7/1985 | Japan | 73/49.3 |
| 2059381 | 4/1981 | United Kingdom | 73/49.3 |

*Primary Examiner*—Jerry W. Myracle
*Assistant Examiner*—Hezron E. Williams
*Attorney, Agent, or Firm*—Anthony J. Casella; Gerald E. Hespos

[57] ABSTRACT

A method and apparatus for testing flexible sealed packages of the type wherein the package is at least partially made of a flexible, electrically conductive foil or metallic laminate wherein the capacitance between the flexible conductive foil or metallic laminated of the package and a fixed electrode is measured when the package is subjected externally to a partial vacuum. The apparatus includes an evacuable chamber adapted to support a package under test therewithin so that at least part of the flexible foil or metallic laminate portion of the package lies opposite said fixed electrode and a means for monitoring the capacitance between the electrode and that part of the foil or metallic laminate when the chamber is evacuated.

13 Claims, 2 Drawing Sheets

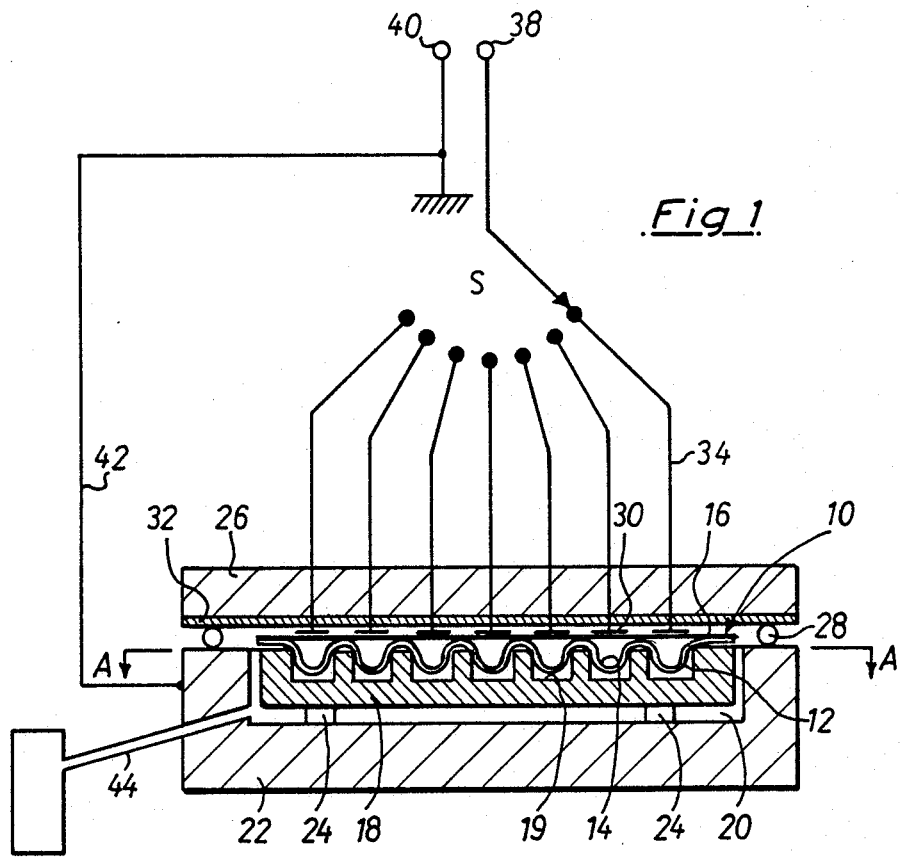
Fig_1
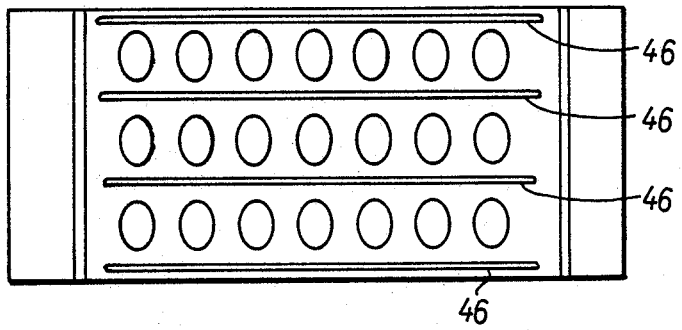
Fig_2

HERMETICALLY SEALED PACKAGE TESTER

BACKGROUND AND SUMMARY OF THE INVENTION

The present invention is concerned with an apparatus and a method of testing hermetically sealed packages, such as pharmaceutical pill packs of the type which have metal foil or metallic laminate in the material of the package.

It is desirable for pharmaceutical pill packs to be hermetically sealed. The current practice is for audit tests to be performed during the packaging process to determine that the packaging has been properly carried out. Such audit tests involve dipping the packs in liquid methylene blue dye and evacuating the system. Any leaking packs fill with dye so that they can be identified by eye and removed manually by an operator. All packs which are tested are destroyed and the process is also very slow and messy.

It is an object of the present invention to provide an improved method and apparatus for testing the hermetic integrity of packages, in particular packages of the type which have a metal foil or metallic laminate in the material of the package.

The method of testing adopted in the present invention relies on the property of flexible sealed packages to expand when placed in a partial vacuum. If, however, the package leaks under these conditions then the air is expelled from within the package and the package will not expand as much as a properly sealed pack.

In accordance with a first aspect of the present invention there is provided a method of testing flexible sealed packages of the type wherein the packing is at least partially made of an electrically conductive foil or metallic laminate, wherein the capacitance between the conductive foil or metallic laminate of the package and a fixed electrode is measured when the package is subjected externally to a partial vacuum.

In some cases, the measurement of capacitance under vacuum conditions can be compared to the measured capacitance under atmospheric conditions, a predetermined increase of capacitance being indicative of an acceptable package seal.

In other cases, where the spacing between the various components is preset, a meaningful test can be made by absolute measurement of the capacitance under vacuum conditions alone.

In accordance with a second aspect of the invention, there is provided an apparatus for testing flexible sealed packages of the type wherein the package is at least partially made of an electrically conductive foil or metallic laminate, the apparatus comprising an evacuable chamber adapted to support a package under test therewithin so that at least part of said foil or metallic laminate portion of the package lies opposite a fixed electrode in the chamber, and means for monitoring the capacitance between said electrode and that part of the foil or metallic laminate when the chamber is evacuated.

For use in connection with a blister pack type of package having a plurality of individual compartments or "blisters", there can be a corresponding plurality of said electrodes in the chamber and a multiplexing arrangement whereby the capacitance between the foil portion corresponding to each blister and a respective one of said electrodes can be monitored.

Measurement is conveniently made using a capacitance bridge.

It is not essential to make electrical connection direct to the foil or metallic laminate itself for the purposes of capacitance measurement. Blister packs normally have one side made of an electrically nonconductive plastics material. If a further fixed electrode is then disposed beyond the plastics side of the pack, then a series capacitance arrangement is obtained with a first (fixed) capacitor being effectively formed between the further electrode and the foil and a second (variable) capacitance being effectively formed between the foil and the first-mentioned electrodes.

BRIEF DESCRIPTION OF THE DRAWINGS

The invention is described further hereinafter, by way of example only, with reference to the accompanying drawings, in which:

FIG. 1 is a diagrammatic sectional view through one embodiment of an apparatus in accordance with the present invention for testing a hermetically sealed package;

FIG. 2 is a diagrammatic plan view on A—A in FIG. 1; and

DETAILED DESCRIPTION OF THE PREFERRED EMBODIMENT

Figure 3:
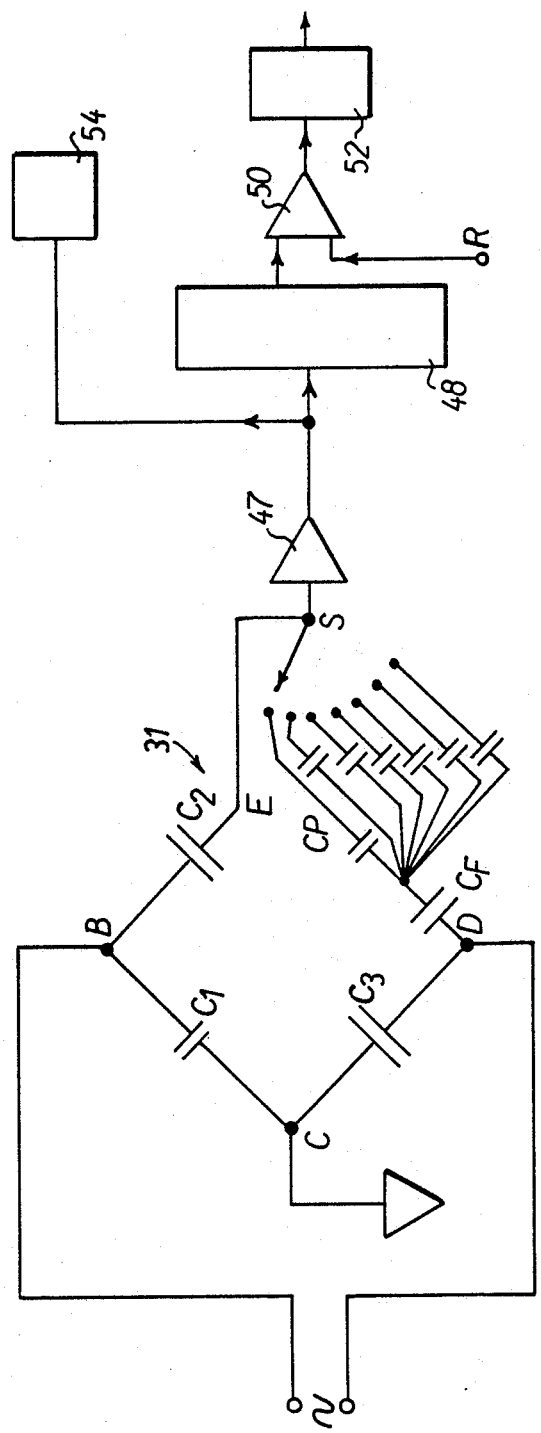
FIG. 3 is a circuit diagram illustrating the electrical part of the apparatus.

The embodiment which is illustrated and described hereinafter is concerned with testing the hermeticity of so-called blister packs for foil-packed pills in which each pill is held in its own sealed "blister". As illustrated in FIG. 1, a blister pack 10 to be tested comprises an electrically non-conductive body 12 formed with a plurality of recesses 14 in each of which is disposed a respective pill (not shown). The surface of the body 12 containing the recesses 14 is covered by a thin layer 16 of metal foil which is sealed to the latter surface so as to separate the recesses into separate, hermetically sealed compartments, each of which contains a pill.

As shown in FIG. 1, the blister pack 10 is laid in a nest 18 which is made of an electrically conductive material and which contains a plurality of recesses 19 into which the pill-containing compartment of the blister pack 10 extend. The nest 18 is itself located within a chamber 20 defined in a metal container 22, the height of the nest 18 in the chamber 20 being determined by electrically conductive, adjustable packing members 24. The chamber can be closed in an air-tight manner by means of a lid 26 and an O-ring seal 28.

The lid 26 acts as an electrode support for a multiplicity of flat electrodes 30 arranged on an electronic printed circuit board 32 adjacent the individual compartments of the blister pack. The individual electrodes 30 are connected by leads 34 to the fixed contacts of a rotary switch S whose movable contact can selectively connect the electrodes 30 to one fixed terminal 38. A second fixed terminal 40 is connected by a lead 42 to the metal container 22 and thence, via the height adjusters 24, to the nest 18.

It will be appreciated that, by virtue of this arrangement, there is formed a multiplicity of pairs of series capacitors, the first capacitor $C_P$ in each pair being established by the capacitance between a respective one of the electrodes 30 and the opposed portion of the metal foil 16 and the second capacitor in that pair being established by the capacitance between the foil 16 and the nest 18. Thus, there is a separate pair of series capacitors for each of the individual electrodes 30, the metal foil backing 16 of the blister pack acting as a second electrode forming a capacitative link to the electrodes 30 on the printed circuit 32.

For the purposes of measurement, it is convenient to place the series capacitors in a capacitance bridge 31, as illustrated in FIG. 3. Since the capacitance of the second capacitor is the same for each series pair, it has been shown by a single capacitor $C_F$ in FIG. 3. The first capacitors $C_P$ corresponding to each of the individual electrodes 30 can be connected selectively into the arm DE of the bridge by the multi-way multiplexing switch S. The other arms of the bridge BE, BC and CD contain fixed capacitors $C_2$, $C_3$, $C_1$, respectively. An alternating supply voltage is applied to the points BD of the bridge and the points CE are connected to a detector circuit, indicated schematically by an amplifier 47. The capacitance $C_P$, formed between the individual electrodes 30 and the pill pack foil can thereby be measured in turn by taking a separate measurement for each position of the switch S.

In performing a test, the pack 10 is placed in the nest 18 and the lid 26 is closed. Each capacitance $C_P$ is measured in turn and memorised in a memory 48. A vacuum is then applied to the chamber 20 for a short time by means of a pressure control device 43, such as a vacuum pump, and by way of a duct 44 and the capacitances $C_P$ are all measured again. In the event that any particular blister is properly sealed, the portion of the foil 16 covering that blister will bulge outwardly somewhat in the direction of the adjacent electrode 30 such that the measured capacitance $C_P$ at that electrode 30 will increase. Thus, a measured increase of capacitance is indicative of a properly sealed blister. A minimum capacitance change can be set on a comparator 50 and compared with a preselected reference R below which the pack is rejected by a reject/accept detector 52.

It is advantageous to include a thin gasket 46 (see FIG. 2) (for example of neoprene) to ensure correct spacing of the pack 10 away from the electrodes 30. With the gaskets 46 in place it is possible to set an absolute capacitance level which must be exceeded before the pack is accepted. This removes the necessity of memorising individual capacitances in many circumstances.

If very small leaks are present, then the pack will swell on first applying the vacuum but will slowly relax as the air is lost from inside the pack. It is possible to detect such small leaks by the use of a device 54 which detects the rate of change of the detected signal from the amplifier 47 and hence the rate of change of capacitance in the circuit, which is indicative of the leak rate. The two measures of capacitance and rate of change of capacitance can be employed to find both large and small leaks in the pack.

Other types of foil packs can be tested by the same technique but with different types of evacuation chamber and electrode arrangements. For example, if it is convenient to make direct electrical contact to the foil itself, then the other capacitance $C_F$ is eliminated and one is just measuring the increase of capacitance of a capacitor when the spacing between its two electrodes is reduced.

The method is particularly suitable for pharmaceutical packs and food packs, but is adaptable to all hermetically sealed conductive packs.

Some pill packs, by virtue of their manner of formation, have raised foils which would show little or no movement under vacuum if simply subjected to the aforegoing technique. In this case, the pressure controlling device of FIG. 1 is arranged initially to provide a positive pressure to the pill pack via the duct 44 before then subjecting the pill pack to vacuum as before. This positive pressure application forces the foil over the blisters into a depressed state before the vacuum causes a raised state. The test is then otherwise the same as before.

Furthermore, in the case of packs with only small leaks, the test time can be reduced by applying ramp functions of pressure and/or vacuum change rather than simply a sudden on/off change.

The present invention thus provides a fast, nondestructive method of testing hermetically sealed packs which enables the packs to be used after testing (if successful). The speed of testing available by the method allows testing of 100% of the product and not just a representative sample as hitherto.

We claim:

1. Apparatus for testing fexible sealed packages of the blister pack type whose one side is made of an electrically non-conductive plastics material defining individual sealed blister compartments which are closed off by a common, flexible, electrically conductive foil defining the opposite side of the pack, the apparatus comprising:
   (a) a chamber adapted to support a package under test therewithin;
   (b) means for selectively evacuating the chamber;
   (c) a plurality of first fixed electrodes in said chamber positioned so as to lie opposite to the respective parts of the foil corresponding to the individual blisters when a blister pack under test is supported in the chamber;
   (d) a second fixed electrode in said chamber which, in use, lies on the non-conductive side of the pack whereby a series capacitance arrangement is obtained, with a first fixed capacitance ($C_F$) being effectively formed between said second, fixed electrode and said flexible, electrically conductive foil of the package and a second variable capacitance ($C_P$) being effectively formed between the flexible, electrically conductive foil of the package and said first fixed electrodes; and
   (e) a multiplexing means enabling sequential monitoring of the capacitance between the respective part of the foil or metallic laminate corresponding to each blister and the respective one of said first fixed electrodes.

2. Apparatus according to claim 1, wherein said second fixed electrode is in the form of a nest, providing a plurality of depressions for receiving respective ones of the blisters of said package during a test.

3. Apparatus according to claim 2, wherein said nest is positioned in the chamber on electrically conductive, packing members of adjustable height.

4. Apparatus according to claim 1, wherein said plurality of electrodes are carried by a printed circuit board which forms part of a removable lid of the chamber.

5. Apparatus according to claim 1, including a comparator means for comparing the measured capacitance under vacuum conditions with a reference level in order to distinguish acceptable packages from packages to be rejected.

6. Apparatus according to claim 1, including means for detecting the rate of change of capacitance under vacuum conditions.

7. Apparatus for testing flexible sealed packages of the type wherein the package is at least partially made of a flexible, electrically conductive material, the apparatus comprising
   (a) a chamber;
   (b) means for sequentially subjecting the chamber to a positive pressure and then selectively evacuating the chamber;
   (c) a first fixed electrode disposed in said chamber;
   (d) the chamber being adapted to support therewithin a package to be tested so that at least part of said flexible electrically conductive portion of the package lies opposite said first fixed electrode, and
   (e) means for monitoring the capacitance between said first fixed electrode and that part of said flexible, electrically conductive portion of the package when the chamber is evacuated.

8. Apparatus according to claim 7 for use in connection with a blister pack type of package having a plurality of individual blister compartments, the apparatus including a corresponding plurality of said first fixed electrodes in said chamber and a multiplexing means arranged whereby the capacitance between the respective part of the flexible metallic portion corresponding to each blister and a respective one of said first fixed electrodes can be monitored sequentially.

9. Apparatus according to claim 8 for use when the blister pack is of the type having one side made of an electrically non-conductive plastics material and the other side formed of said flexible, electrically conductive material, wherein the apparatus includes a second fixed electrode in said chamber which, in use, lies on the non-conductive side of the pack whereby a series capacitance arrangement is obtained, with a first (fixed) capacitance being effectively formed between said second fixed electrode and said flexible, electrically conductive portion of the package and a second (variable) capacitance being effectively formed between the flexible, electrically conductive portion of the package and said first fixed electrodes.

10. Apparatus according to claim 9, wherein said second fixed electrode is in the form of a nest, providing a plurality of depressions for receiving respective ones of the blisters of said package during a test.

11. Apparatus according to claim 8, wherein said plurality of electrodes are carried by a printed circuit board which forms part of a removable lid of the chamber.

12. Apparatus according to claim 7, including a comparator means for comparing the measured capacitance under vacuum conditions with a reference level in order to distinguish acceptable packages from packages to be rejected.

13. Apparatus according to claim 7, including means for detecting the rate of change of capacitance under vacuum conditions.

* * * * *